United States Patent [19]
Huang et al.

[11] Patent Number: 5,230,545
[45] Date of Patent: Jul. 27, 1993

[54] CONVENIENT AWNING ASSEMBLY FOR PARKED CARS

[76] Inventors: Ching Y. Huang, No. 4, Tuu Kuh Jian, Shen Keng Village, Taipei County, Taiwan; Yueh F. Wang, 3F, No. 29, Alley 6, Lane 125, Wuu Cherng St., Taipei City, Taiwan

[21] Appl. No.: 960,704
[22] Filed: Oct. 14, 1992
[51] Int. Cl.$^5$ ............................................. B60B 7/00
[52] U.S. Cl. ................................. 296/95.1; 296/136; 296/163; 160/370.2 R
[58] Field of Search ............ 296/95.1, 99.1, 163, 296/136; 160/370.23

[56] References Cited

U.S. PATENT DOCUMENTS

| | | | |
|---|---|---|---|
| 4,848,827 | 7/1989 | Ou | 296/99.1 |
| 4,929,016 | 5/1990 | Kastanis | 296/136 |
| 4,950,020 | 8/1990 | Chen | 296/95.1 |
| 5,004,290 | 4/1991 | Kim | 296/99.1 |

*Primary Examiner*—Robert R. Song
*Attorney, Agent, or Firm*—Morton J. Rosenberg; David I. Klein

[57] ABSTRACT

The present invention relates to a convenient awning assembly for parked cars which mainly consists of a pair of fixing frames mounted on car roof near front and rear portions thereof, a driving motor case disposed between the two fixing frames near one lateral side of car roof, two manually-operated awning roller assemblies separately fixed to the fixing frames to provide retractable awnings which can be adhered to windshields by sucker means when they are pulled out; a side awning roller assembly which has an retractable awning connected to a pair of power-actuated bars controlled by the motor in the driving motor case, and two storage compartments each being parallelly attached to inner side of the two fixing frames. With the present invention, a driver can have a shaded place to take a rest at any time he parks the car at a safe place and can provide a temporary rain awning for passengers in rainy days.

4 Claims, 4 Drawing Sheets

CONVENIENT AWNING ASSEMBLY FOR PARKED CARS

BACKGROUND OF THE INVENTION

Following the high economic development and upgraded living standard nowadays, cars have long ago become a necessary traffic means in our daily life. Since there are only limited indoor parking lots available for the speedily increasing cars, most cars expose to sunlight or rainwater when they are parked. There are some kinds of cover conveniently supplied as automotive accessory, they are, however, inconvenient in operation, especially when the car is temporarily parked somewhere.

Therefore, it is desirable to have a simple and convenient means which, when used in sunny days, can provide sufficient shade a parked car, and, when used in rainy days, may conveniently provides passengers an temporary awning to prevent the passengers from being wetted when they are getting on or off the car.

SUMMARY OF THE INVENTION

The primary object of the present invention is to provide an easily and conveniently-operated awning assembly which consists of a pair of fixing frames and a driving mechanism fixed to the car roof, a pair of power-actuated retractably movable bars connected to the driving mechanism, storage compartments, and awning roller assemblies fixed to the fixing frames, and can be easily operated to achieve projected shading effect.

DETAILED DESCRIPTION OF THE PREFERRED EMBODIMENTS

Figure 1:
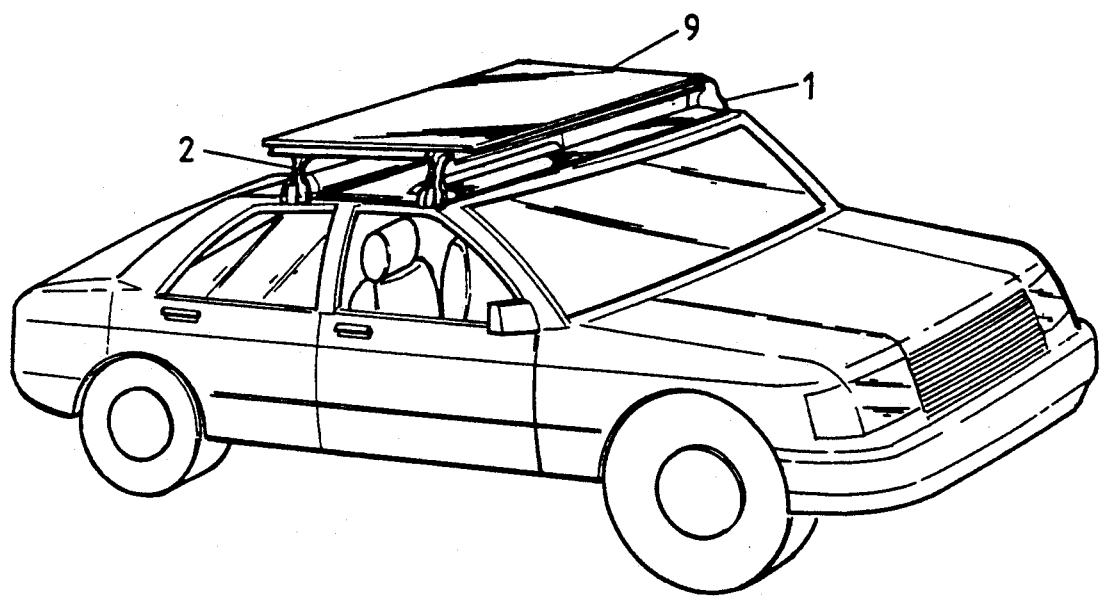
FIG. 1 illustrates a car on roof of which an awning assembly according to the present invention is installed.
Figure 2:
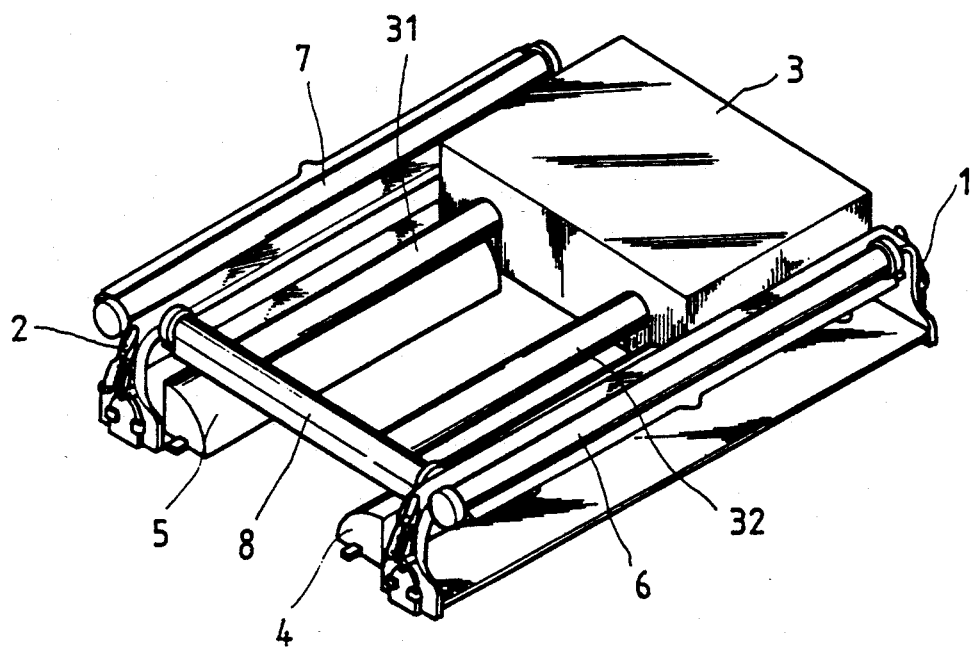
FIG. 2 is an assembled three-dimensional perspective of the awning assembly according to the present invention in which the top awning is removed for clarity in illustration.

Please refer to FIG. 1, the present invention is suitable for being mounted on a car roof by means of a front fixing frame 1 and a rear fixing frame 2 which are separately fixed to adequate positions near the front and the rear part of the car roof, respectively, and have a width substantially equal to that of car roof. The present invention, as shown in FIG. 2, generally consists of a top awning 9, a driving motor case 3 disposed between the front and the rear fixing frames 1, 2 with its one lateral side near the edge of the car roof, two storage compartments 4, 5, a front awning roller assembly 6 and a rear awning roller assembly 7 fixed to the front and the rear fixing frames 1, 2, respectively, two sleeves 31, 32 extending from another lateral side of the driving motor case 3 in a direction parallel to the two fixing frames 1, 2, and a side awning roller assembly 8 fixed between the two fixing frames 1, 2 at the end opposite to the driving motor case 3.

Figure 3:
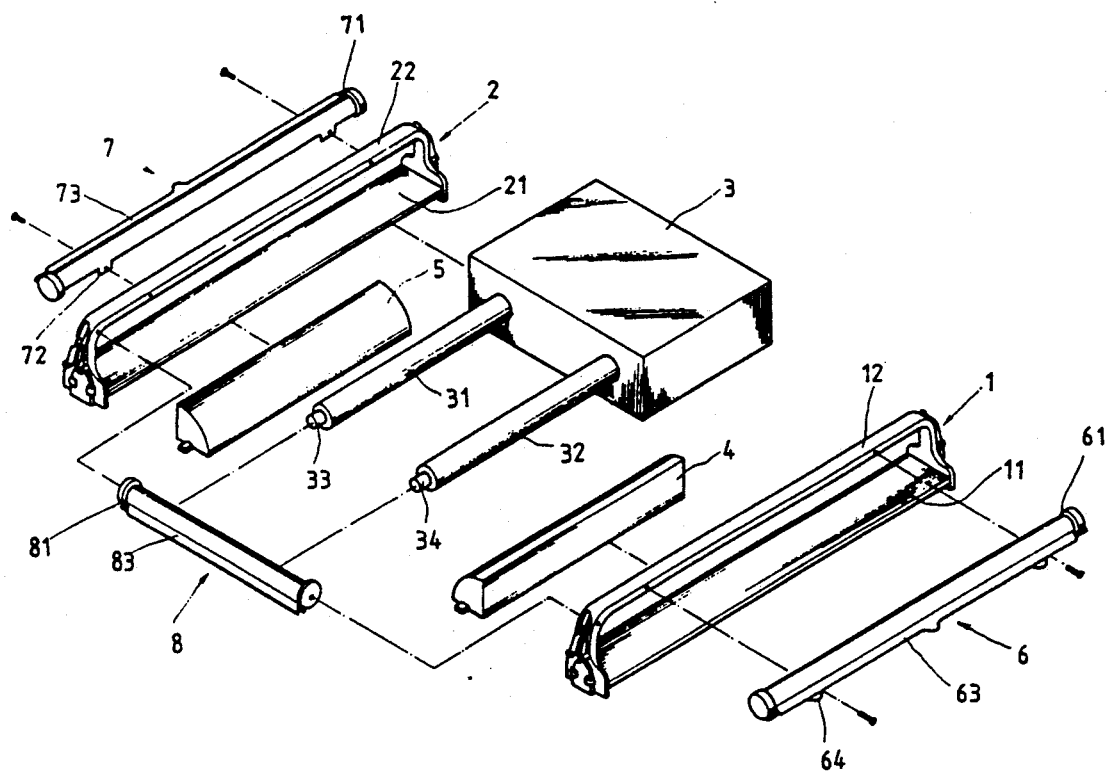
FIG. 3 is a disassembled perspective of the awning assembly according to the present invention, and again, the top awning is removed.

Please refer to FIG. 3 for the detailed structure of the present invention. The front and the rear fixing frames 1, 2 respectively have a bottom plate 11, 21, and a top support 12, 22 two ends of which are connected to two ends of the bottom plate 11, 21, respectively. The storage compartments 4, 5 are parallelly attached to inner edge of the bottom plate 11, 21 of the fixing frames 1, 2, respectively, and have a width smaller than that of the fixing frames 1, 2, allowing the driving motor case 3 to be disposed between the remaining length of the fixing frames 1, 2 with its front and rear sides direct contacting the inner edges of the fixing frames 1, 2. The front and the rear awning roller assemblies 6, 7 consist of an awning roller 61, 71 and an awning 63, 73, respectively. The front and the rear awning rollers 61, 71 are formed of lugs 62, 72 (lugs 62 are not shown in the figure but their positions on the awning roller 61 are corresponding to that of lugs 72 on the awning roller 7), respectively. By means of the lugs 62, 72, the awning roller assemblies 6, 7 are properly screwed to the top supports 12, 22, respectively. The front awning 63 and the rear awning 73 are received in the awning rollers 61, 71, respectively, and can be retractably pulled out of the awning rollers 61, 71 via openings formed thereof. Suckers 64, 74 are provided in front of the awning 63, 73 near two outer sides thereof, respectively (suckers 74 are not shown in the figure but their positions on the awning sheet 73 are corresponding to that of suckers 64 on the awning sheet 63). In the two sleeves 31, 32, two power-actuated retractably extending bars 33, 34 are provided therein, respectively. When a motor in the driving motor case 3 is started, it will actuate the bars 33, 34 to retractably move sideward. The side awning roller assembly 8 consists of an awning roller 81 and a side awning 83, the front edge of the side awning 83 is connected to the two power-actuated retractably extending bars 33, 34, allowing the side awning 83 to extend out when the bars 33, 34 are actuated to move out by the motor in the driving motor case 3. Since this is a known art similar to that used in the common retractable automotive antenna, it is not described herein.

Figure 4:
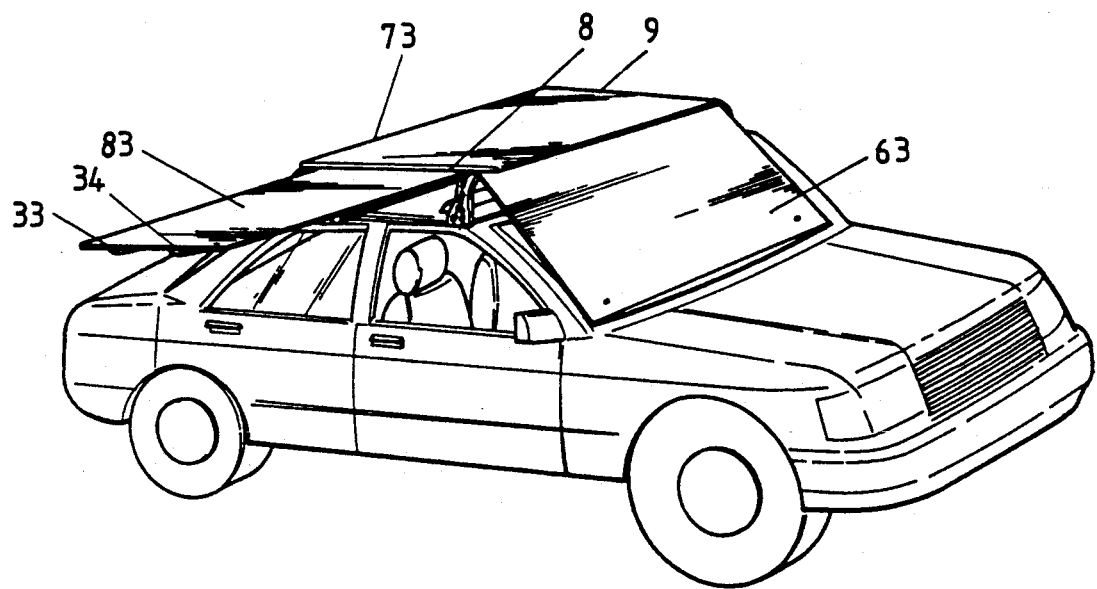
FIG. 4 illustrates an awning assembly of the present invention installed on car roof with its awnings extended in operation positions.

The awning assembly according to the present invention is fixedly mounted on top of a car roof by means of the fixing frames 1, 2 and the driving motor case 3, and the top awning 9 is normally connected to the top supports 12, 22 of the fixing frames 1, 2 or the driving motor case 3. FIG. 1 shows the front, rear, and side awning roller assemblies 6, 7, 8 thereof in an awning-retracted state when they are not in use. The top awning 9 protects not only a parked car but also the other components of the present invention from direct exposure to the sunlight or rainwater. FIG. 4 shows the front, rear, and side awnings 63, 73, 83 in an extended or use state. The front and rear awnings 63, 73 are manually pulled to the lower edge of windshields and are held there to by means of the suckers provided at front edge of the awnings 63, 73. When a driver needs to take a rest during the course of driving under strong sunshine, he or she may simply park the car at some safe place and pull down the front and the rear awnings to get the car under desirable shade. In rainy days, the motor in the driving motor case may be started when necessary, and causes the two power-actuated bars 33, 34 to move outward and thereby pull out the side awning 83 connected thereto to form a temporary shield to protect passengers from getting wet when they open or close their umbrella before getting off or on the car, respectively.

Following advantages are available from using the present invention:

1. The front and the rear awnings are easy in operation and may form between them and the car roof a space large enough for sufficient fresh air to flow therethrough and effect good insulation thereof, keeping indoor of the car in a cool state. The driver may take and enjoy a comfortable rest without needing to find a shaded place.
2. The side awning roller assembly is electrically controlled and can, therefore, timely provide passengers with useful protection when they are getting on or off the car in rainy days.
3. The storage compartments are provided between the two fixing frames without any reverse influence on the appearance of the car. The room provided by the storage compartments is easily accessible and suitable for accommodating umbrella, rain coat, tools, etc.

What is claimed is:

1. A convenient awning assembly for parked cars comprising:
    a pair of fixing frames suitable to be separately mounted on a car roof at front and rear portions thereof;
    two manually-operated awning roller assemblies separately fixed to said fixing frames, each consisting of an awning roller and an awning received in said awning roller, and said awnings being retractably pullable to cover front or rear windshield of a car on which said awning assembly is mounted;
    a driving motor case disposed between said two fixing frames near one lateral side of car roof, having two sleeves extended from its sidewall toward other lateral side of said car roof and in parallel to said fixing frames; said two sleeves each having an power-actuated bar therein which retractably moves sideward in a direction opposite to said driving motor case when motor in said driving motor case is started; and
    a side awning roller assembly fixed between said two fixing frames at one end opposite to said driving motor case and consisting of an awning roller and a side awning, front edge of said side awning being connected to front end of said power-actuated bars so that said side awning may be timely extended to form a shade when said power-actuated bars are actuated to move sideward by said motor in said driving motor case.

2. A convenient awning assembly for parked cars as claimed in claim 1, wherein said awnings of said manually-operated awning roller assemblies are provided with suckers at their front edge so that said awnings may be adhered to the surface of windshields by suction when they are pulled out to break sunlight.

3. A convenient awning assembly for parked cars as claimed in claim 1, wherein storage compartments may be suitably disposed between said fixing frames to accommodate articles.

4. A convenient awning assembly for parked cars as claimed in claim 1, wherein a top awning is provided above car roof by attaching it to said two fixing frames or said driving motor case so that said driving motor case and said awning roller assemblies may be protected by said top awning from direct exposure to sunlight or rainwater.

* * * * *